United States Patent
Andriolo et al.

(10) Patent No.: US 10,272,624 B2
(45) Date of Patent: Apr. 30, 2019

(54) EXTRUSION BLOW-MOLDED ARTICLES AND PROCESS FOR THEIR PRODUCTION

(75) Inventors: Patrizio Andriolo, Morlanwelz (BE); Alain Gris, Maubeuge (FR)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 706 days.

(21) Appl. No.: 13/988,409

(22) PCT Filed: Nov. 18, 2011

(86) PCT No.: PCT/EP2011/070447
§ 371 (c)(1),
(2), (4) Date: Sep. 6, 2013

(87) PCT Pub. No.: WO2012/066120
PCT Pub. Date: May 24, 2012

(65) Prior Publication Data
US 2013/0337211 A1    Dec. 19, 2013

(30) Foreign Application Priority Data

Nov. 18, 2010  (EP) .................................... 10191728
Jan. 24, 2011  (EP) .................................... 11151845

(51) Int. Cl.
| | | |
|---|---|---|
| A61F 5/00 | (2006.01) | |
| B29D 22/00 | (2006.01) | |
| B29C 49/00 | (2006.01) | |
| B29C 49/04 | (2006.01) | |
| C08L 23/14 | (2006.01) | |
| B29K 23/00 | (2006.01) | |

(52) U.S. Cl.
CPC ........ *B29D 22/003* (2013.01); *B29C 49/0005* (2013.01); *B29C 49/04* (2013.01); *C08L 23/142* (2013.01); *B29K 2023/083* (2013.01); *B29K 2023/086* (2013.01); *B29K 2023/14* (2013.01); *C08L 2314/06* (2013.01); *Y10T 428/1397* (2015.01)

(58) Field of Classification Search
CPC ........ C08L 23/10; C08L 23/142; C08L 23/12; C08L 2205/02; B29K 2023/12; B29K 2023/14; B29L 2007/00; B29L 2031/712; A61F 5/00
USPC .......................................... 206/438; 128/845
See application file for complete search history.

(56) References Cited

U.S. PATENT DOCUMENTS

| | | | | |
|---|---|---|---|---|
| 7,183,005 B2 * | 2/2007 | Poloso | ...................... | B32B 1/02 428/34.1 |
| 2008/0128959 A1 * | 6/2008 | Kunz | ...................... | B29C 49/48 264/527 |
| 2008/0152851 A1 | 6/2008 | McKeeman et al. | | |
| 2010/0243498 A1 | 9/2010 | Sun et al. | | |
| 2011/0059668 A1 * | 3/2011 | Bieser | ...................... | D01F 6/06 442/401 |
| 2012/0034454 A1 * | 2/2012 | Schedenig | ............. | B32B 27/32 428/336 |

FOREIGN PATENT DOCUMENTS

| | | | |
|---|---|---|---|
| EP | 0152701 | A1 | 8/1985 |
| EP | 0368577 | A2 | 5/1990 |
| EP | 1 002 809 | A1 | 5/2000 |
| EP | 1 614 699 | A1 | 1/2006 |
| EP | 1 865 005 | A2 | 12/2007 |
| JP | 0873532 | A | 3/1996 |
| JP | 2002-275330 | A | 9/2002 |
| JP | 2002-275332 | A | 9/2002 |
| JP | 2002275332 | A * | 9/2002 |
| JP | 2006131275 | A | 5/2006 |
| JP | 2007511630 | A | 5/2007 |
| JP | 2009154459 | A | 7/2009 |
| JP | 2009172847 | A | 8/2009 |
| WO | 03102069 | A1 | 12/2003 |
| WO | 2007022168 | A1 | 2/2007 |

OTHER PUBLICATIONS

Randall et al; Initial 2,1-Insertions in Metallocene Polymerizations of Polypropylene; Metalorganic Catalysts for Synthesis and Polymerization pp. 601-615 (1999).*
Blomenhofer et al. "Designer Nucleating Agents for Polypropylene" Macromolecules 2005, 38, 3688-3695.
Plastics Additives Handbook, ed. H. Zweifel, 5th edition, 2001, Hanser Publishers.
A. Razavi, et al., "The Geometry of the Site and its Relevance for Chain Migration and Stereospecificity" Macromol. Symp., vol. 89, pp. 345-367, 1995.
H.N. Cheng, et al., "13C Nuclear Magnetic Resonance Characterization of Poly(propylene) Prepared with Homogeneous Catalysts", Makromol. Chem., vol. 190 (1989), pp. 1931-1940.
International Search Report for International Application No. PCT/EP2011/070447 dated May 15, 2012, 3 pages.
English translation of Office Action issued in Taiwanese Application No. 100141745, 2 pages.
Office Action issued in Japanese Application No. 2013-539284, dated Oct. 31, 2014, 9 pages.
Notice of Opposition issued in European Application No. 11785664.1, dated Jul. 13, 2015, 12 pages.
EP Application No. 10191728, filed on Nov. 18, 2010.

* cited by examiner

*Primary Examiner* — Ophelia A Hawthorne
*Assistant Examiner* — Caitlin Carreiro
(74) *Attorney, Agent, or Firm* — Albert Shung

(57) ABSTRACT

Extrusion blow-molded articles which may include a polypropylene layer are described. The polypropylene layer may include a polypropylene composition layer which may have a specific random copolymer of propylene and at least one comonomer. Also described are processes for the production of such extrusion blow-molded articles.

20 Claims, No Drawings

EXTRUSION BLOW-MOLDED ARTICLES AND PROCESS FOR THEIR PRODUCTION

CROSS-REFERENCE TO RELATED APPLICATIONS

This application claims the benefit of PCT/EP2011/070447, filed on Nov. 18, 2011, which claims priority from EP 10191728.4, filed on Nov. 18, 2010, and EP 11151845.2, filed on Jan. 24, 2011.

FIELD OF THE INVENTION

The present application relates to extrusion blow-molded articles comprising a polypropylene layer, said polypropylene layer consisting of a polypropylene composition comprising a specific random copolymer of propylene and at least one comonomer. The present application also relates to a process for the production of such extrusion blow-molded articles.

THE TECHNICAL PROBLEM AND THE PRIOR ART

Generally, in the extrusion blow-molding process a parison is formed by melt-extruding a molten polymer composition (preferably in a downward direction), clamped into a mold, expanded by gas pressure to obtain an expanded parison corresponding to the shape of the mold, cooled, ejected from the mold and optionally trimmed as necessary.

Depending on whether the extrusion is done continuously or not, one may distinguish between a continuous extrusion blow-molding process or an intermittent extrusion blow-molding process. In the continuous process, the molten polymer is extruded continuously from the extruder and two or more molds must shuttle back and forth between the parison drop area, where the parison is captured and clamped into the mold, and a cooling area, where the parison is expanded by gas pressure, cooled and finally ejected. In the intermittent process a single (stationary) mold is used and the extruder is equipped with an accumulator head, which allows to collect molten polymer composition.

Due to the fact that the parison must hold while it is being extruded until the mold captures and clamps it, polymer compositions used in extrusion blow-molding must have good melt strength. For this reason commercially available polypropylene grades are characterized by low melt flow indices. Generally, the melt flow index of commercial extrusion blow-molding grades are very low so as to result in sufficient melt strength to be suited for extrusion blow-molding.

However, industry remains further interested in improving the processability and/or throughput of polypropylene in extrusion blow-molding, while at the same time keeping the properties of the extrusion blow-molded article at a sufficient level.

It is therefore an object of the present application to provide an extrusion blow-molding process for the production of an extrusion blow-molded article, allowing said article to be produced with good processability.

Additionally, it is an object of the present application to provide an extrusion blow-molding process for the production of an extrusion blow-molded article, said process resulting in reduced energy consumption.

Furthermore, it is an object of the present application to provide an extrusion-blow molding process for the production of an extrusion blow-molded article, said process having increased throughput.

It is a further object of the present application to provide an extrusion blow-molded article having acceptable mechanical properties.

It is also an object of the present application to provide an extrusion blow-molded article having acceptable optical properties.

BRIEF DESCRIPTION OF THE INVENTION

The inventors named in the present application have surprisingly found that any one of these objects can be attained either individually or in any combination by providing an extrusion blow-molded article consisting of a polypropylene composition, said polypropylene composition comprising a well-defined random copolymer of propylene and at least one comonomer.

Thus, the present application provides for an extrusion blow-molded article comprising a polypropylene layer, said polypropylene layer consisting of a polypropylene composition comprising a random copolymer of propylene and at least one comonomer, wherein the random copolymer has a molecular weight distribution, defined as $M_w/M_n$, of at most 4.0, a percentage of 2,1-insertions of at least 0.1%, relative to the total number of propylene molecules in the chain, and comprises at most 7.0 wt %, relative to the total weight of said random copolymer, of the at least one comonomer.

The present application also provides for a process for the production of an extrusion blow-molded article, said process comprising the steps of
 (a) polymerizing propylene and at least one comonomer with a metallocene-based polymerization catalyst to obtain a random copolymer of propylene and at least one comonomer, wherein the random copolymer comprises at most 7.0 wt %, relative to the total weight of said random copolymer, of the at least one comonomer;
 (b) melt-extruding a polypropylene composition comprising the random copolymer prepared in step (a) to form a parison of said molten polypropylene composition;
 (c) clamping the parison into a mold so that the parison is closed off at both ends to form a clamped-off parison;
 (d) injecting a gas under pressure into said clamped-off parison to obtain an expanded parison having the shape of the mold;
 (e) finally cooling and ejecting the extrusion blow-molded article.

Furthermore, the present application provides for the use of said extrusion blow-molded article in packaging applications.

DETAILED DESCRIPTION OF THE INVENTION

Throughout the present application the terms "polypropylene" and "propylene polymer" may be used synonymously.

Throughout the present application the term "propylene random copolymer" may be used to denote a "random copolymer of propylene and at least one comonomer". The term "metallocene propylene random copolymer" may be used to denote a "random copolymer of propylene and at least one comonomer having been produced with a metallocene-based polymerization catalyst".

Throughout the present application the melt flow index, abbreviated as "MFI", of polypropylene and polypropylene compositions is determined according to ISO 1133, condition L, at 230° C. and 2.16 kg.

Throughout the present application the term "tetrahydroindenyl" signifies an indenyl group wherein the six-membered ring has been hydrogenated to form 4,5,6,7-tetrahydroindenyl.

In general terms, the present application provides for an extrusion blow-molded article comprising a polypropylene layer as defined in the following. Preferably, said extrusion blow-molded article is a container, which can be used e.g. for the storage and transport of, for example, liquids or powders or gels or particulate materials. More preferably, said extrusion blow-molded container is a bottle, having, by way of non-limiting example, a round, oval or square shape. Said extrusion blow-molded article can also be with or without a handle. The extrusion blow-molded article has a preferred volume from a few milliliters, for example 5 or 10 or 50 or 100 ml, to at most 1 l or 5 l or 10 l.

Preferably, the extrusion blow-molded article has a wall thickness of at least 300 µm, more preferably of at least 400 µm, even more preferably of at least 500 µm, and most preferably of at least 600 µm. Preferably, the wall thickness of the extrusion blow-molded article is at most 2000 µm, more preferably at most 1500 µm or 1400 µm, even more preferably at most 1300 µm or 1200 µm, still even more preferably at most 1100 µm, and most preferably at most 1000 µm.

Polypropylene Composition

The polypropylene composition, of which the polypropylene layer consists, comprises a random copolymer of propylene and at least one comonomer. For the purpose of the present application it is essential that said random copolymer of propylene and at least one comonomer has been produced with a metallocene-based polymerization catalyst, i.e. is a metallocene propylene random copolymer. It is further essential that said random copolymer of propylene and at least one comonomer comprises at most 7.0 wt %, relative to the total weight of the random copolymer, of the at least one comonomer.

Preferably, the polypropylene composition comprises at least 50 wt % or 70 wt %, more preferably at least 80 wt % or 90 wt %, even more preferably at least 95 wt % or 97 wt %, and still even more preferably at least 99 wt %, relative to the total weight of said polypropylene composition, of the metallocene propylene random copolymer. Most preferably, said polypropylene composition consists of the metallocene propylene random copolymer. The remainder of said polypropylene composition may be one or more thermoplastic polymers as defined below.

Preferably, the metallocene propylene random copolymer comprises at least 0.5 wt %, more preferably at least 1.0 wt %, even more preferably at least 1.5 wt %, and most preferably at least 2.0 wt %, relative to the total weight of said metallocene propylene random copolymer, of the at least one comonomer. Preferably, the metallocene propylene random copolymer comprises at most 7.0 wt %, relative to the total weight of said random copolymer, of the at least one comonomer, more preferably at most 6.0 wt % or 5.0 wt % or 4.5 wt %, even more at most 4.0 wt %, still even more preferably at most 3.5 wt %, and most preferably at most 3.0 wt %.

Preferably, the metallocene propylene random copolymer of propylene and at least one comonomer is a random copolymer of propylene and at least one alpha-olefin different from propylene. Preferred alpha-olefins are ethylene, butene-1, pentene-1, hexene-1 and 4-methyl-pentene-1. More preferred alpha-olefins are ethylene, butene-1 and hexene-1. The most preferred alpha-olefin is ethylene. Thus, the most preferred propylene random copolymer used herein is a random copolymer of propylene and ethylene.

Preferably, the metallocene propylene random copolymer used herein has a melt flow index of at least 3.0 dg/min, more preferably of at least 4.0 or 5.0 dg/min, even more preferably of at least 6.0 dg/min, still even more preferably of at least 7.0 dg/min, and most preferably of at least 8.0 dg/min. Preferably, the metallocene propylene random copolymer has a melt flow index of at most 25 dg/min, more preferably of at most 20 dg/min, even more preferably of at most 18 dg/min, still even more preferably of at most 16 dg/min, and most preferably of at most 14 dg/min.

The metallocene propylene random copolymer used herein has a molecular weight distribution, defined as $M_w/M_n$, i.e. the ratio of weight average molecular weight $M_w$ over number average molecular weight $M_n$, of at most 4.0. Preferably, the metallocene propylene random copolymer used herein has a molecular weight distribution, defined as $M_w/M_n$, of at most 3.5, more preferably of at most 3.0, and most preferably of at most 2.8. Preferably, the metallocene propylene random copolymer used herein has a molecular weight distribution (MWD), defined as $M_w/M_n$, of at least 1.0, more preferably of at least 1.5 and most preferably of at least 2.0. Molecular weights can be determined by size exclusion chromatography (SEC) as described in the test methods.

Preferably, the metallocene propylene random copolymer used herein is characterized by high isotacticity, for which the content of mmmm pentads is a measure. Preferably, the content of mmmm pentads is at least 90%, more preferably at least 95%, and most preferably at least 97%. The isotacticity may be determined by $^{13}$C-NMR analysis as described in the test methods.

The metallocene propylene random copolymer used herein is characterized by a percentage of 2,1-insertions, relative to the total number of propylene molecules in the polymer chain, of at least 0.1%. Preferably, the percentage of 2,1-insertions is at most 1.5%, more preferably at most 1.3%, even more preferably at most 1.2%, still even more preferably at most 1.1%, and most preferably at most 1.0%. The percentage of 2,1-insertions may be determined as indicated in the test methods.

Preferably, the metallocene propylene random copolymer used herein comprises at least two propylene polymer fractions, which may differ in their respective comonomer content or in their respective melt flow index or in both, provided that the properties of the metallocene propylene random copolymer are as given above.

The metallocene propylene random copolymer used herein is obtained by polymerizing propylene and at least one comonomer with a metallocene-based polymerization catalyst. Preferably the metallocene-based polymerization catalyst comprises a bridged metallocene component, a support and an activating agent. Such metallocene-based polymerization catalysts are generally known in the art and need not be explained in detail.

The metallocene component can be described by the following general formula $$(\mu\text{-}R^a)(R^b)(R^c)MX^1X^2 \qquad (I)$$

wherein $R^a$, $R^b$, $R^c$, M, $X^1$ and $X^2$ are as defined below.

$R^a$ is the bridge between $R^b$ and $R^c$, i.e. $R^a$ is chemically connected to $R^b$ and $R^c$, and is selected from the group consisting of $-(CR^1R^2)_p-$, $-(SiR^1R^2)_p-$, $-(GeR^1R^2)_p-$, $-(NR^1)_p-$, $-(PR^1)_p-$, $-(N^+R^1R^2)_p-$ and $-(P^+R^1R^2)_p-$, and p is 1 or 2, and wherein $R^1$ and $R^2$ are each independently selected from the group consisting of hydrogen, $C_1$-$C_{10}$ alkyl, $C_5$-$C_8$ cycloalkyl, $C_6$-$C_{15}$ aryl, alkylaryl with $C_1$-$C_{10}$ alkyl and $C_6$-$C_{15}$ aryl, or any two neighboring R (i.e. two neighboring $R^1$, two neighboring $R^2$, or $R^1$ with a neighboring $R^2$) may form a cyclic saturated or non-saturated $C_4$-$C_{10}$ ring; each $R^1$ and $R^2$ may in turn be substituted in the same way. Preferably $R^a$ is —$(CR^1R^2)_p$— or —$(SiR^1R^2)_p$— with $R^1$, $R^2$ and p as defined above. Most preferably $R^a$ is —$(SiR^1R^2)_p$— with $R^1$, $R^2$ and p as defined above. Specific examples of $R^a$ include $Me_2C$, ethanediyl (—$CH_2$—$CH_2$—), $Ph_2C$ and $Me_2Si$.

M is a metal selected from Ti, Zr and Hf, preferably it is Zr.

$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl. Preferably $X^1$ and $X^2$ are halogen or methyl.

$R^b$ and $R^c$ are selected independently from one another and comprise a cyclopentadienyl ring.

Preferred examples of halogen are Cl, Br, and I. Preferred examples of $C_1$-$C_{10}$ alkyl are methyl, ethyl, n-propyl, iso-propyl, n-butyl, iso-butyl, and tert-butyl. Preferred examples of $C_5$-$C_7$ cycloalkyl are cyclopentyl, cyclohexyl, cycloheptyl and cyclooctyl. Preferred examples of $C_6$-$C_{15}$ aryl are phenyl and indenyl. Preferred examples of alkylaryl with $C_1$-$C_{10}$ alkyl and $C_6$-$C_{15}$ aryl are benzyl (—$CH_2$-Ph), and —$(CH_2)_2$-Ph.

Preferably, $R^b$ and $R^c$ may both be substituted cyclopentadienyl, or may be independently from one another unsubstituted or substituted indenyl or tetrahydroindenyl, or $R^b$ may be a substituted cyclopentadienyl and $R^c$ a substituted or unsubstituted fluorenyl. More preferably, $R^b$ and $R^c$ may both be the same and may be selected from the group consisting of substituted cyclopentadienyl, unsubstituted indenyl, substituted indenyl, unsubstituted tetrahydroindenyl and substituted tetrahydroindenyl. By "unsubstituted" is meant that all positions on $R^b$ resp. $R^c$, except for the one to which the bridge is attached, are occupied by hydrogen. By "substituted" is meant that, in addition to the position at which the bridge is attached, at least one other position on $R^b$ resp. $R^c$ is occupied by a substituent other than hydrogen, wherein each of the substituents may independently be selected from the group consisting of $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring substituents may form a cyclic saturated or non-saturated $C_4$-$C_{10}$ ring.

A substituted cyclopentadienyl may for example be represented by the general formula $C_5R^3R^4R^5R^6$. A substituted indenyl may for example be represented by the general formula $C_9R^7R^8R^9R^{10}R^{11}R^{12}R^{13}R^{14}$. A substituted tetrahydroindenyl may for example be represented by the general formula $C_9H_4R^{15}R^{16}R^{17}R^{18}$. A substituted fluorenyl may for example be represented by the general formula $C_{13}R^{19}R^{20}R^{21}R^{22}R^{23}R^{24}R^{25}R^{26}$. Each of the substituents $R^3$ to $R^{26}$ may independently be selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring; provided, however, that not all substituents simultaneously are hydrogen.

Preferred metallocene components are those having $C_2$-symmetry or those having $C_1$-symmetry. Most preferred are those having $C_2$-symmetry.

Particularly suitable metallocene components are those wherein $R^b$ and $R^c$ are the same and are substituted cyclopentadienyl, preferably wherein the cyclopentadienyl is substituted in the 2-position, the 3-position, or simultaneously the 2-position and the 3-position.

Particularly suitable metallocene components are also those wherein $R^b$ and $R^c$ are the same and are selected from the group consisting of unsubstituted indenyl, unsubstituted tetrahydroindenyl, substituted indenyl and substituted tetrahydroindenyl. Substituted indenyl is preferably substituted in the 2-position, the 3-position, the 4-position, the 5-position or any combination of these, more preferably in the 2-position, the 4-position or simultaneously in the 2-position and the 4-position. Substituted tetrahydroindenyl is preferably substituted in the 2-position, the 3-position, or simultaneously the 2-position and the 3-position.

Particularly suitable metallocene components may also be those wherein $R^b$ is a substituted cyclopentadienyl and $R^c$ is a substituted or unsubstituted fluorenyl. The substituted cyclopentadienyl is preferably substituted in the 2-position, the 3-position, the 5-position or simultaneously any combination of these, more preferably in the 3-position or the 5-position or both simultaneously, most preferably in the 3-position only, with a bulky substituent. Said bulky substituent may for example be —$CR^{27}R^{28}R^{29}$ or —$SiR^{27}R^{28}R^{29}$ with $R^{27}$, $R^{28}$ and $R^{29}$ independently selected from group consisting of $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring. it is preferred that $R^{27}$, $R^{28}$ and $R^{29}$ are methyl.

Examples of particularly suitable metallocenes are:
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(2-methyl-4-phenyl-indenyl)zirconium dichloride,
ethanediyl-bis(indenyl)zirconium dichloride,
ethanediyl-bis(tetrahydroindenyl)zirconium dichloride,
isopropylidene-(3-tert-butyl-cyclopentadienyl)(fluorenyl) zirconium dichloride
isopropylidene-(3-tert-butyl-5-methyl-cyclopentadienyl) (fluorenyl)zirconium dichloride.

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The metallocene propylene random copolymer used herein is produced by polymerizing propylene and at least one comonomer in presence of a metallocene-based polymerization catalyst to obtain a metallocene random copolymer of propylene and at least one comonomer. The polymerization of propylene and the at least one comonomer in presence of a metallocene-based polymerization catalyst can be carried out according to known techniques in one or more polymerization reactors at temperatures in the range from 20° C. to 150° C. The metallocene propylene random copolymer used herein is preferably produced by polymerization in liquid propylene at temperatures in the range from 20° C. to 120° C. More preferred temperatures are in the range from 60° C. to 100° C. The pressure can be atmospheric or higher. It is preferably between 25 and 50 bar. The molecular weight of the polymer chains, and in consequence the melt flow of the resulting metallocene propylene random copolymer, may be controlled by the addition of hydrogen to the polymerization medium.

Preferably, the metallocene propylene random copolymer is recovered from the one or more polymerization reactors without post-reactor treatment, such as thermal or chemical degradation (e.g. by using peroxides), to reduce its molecular weight and/or narrow the molecular weight distribution, as is often done for polypropylene produced with a Ziegler-Natta catalyst.

Preferably, the polypropylene composition used herein comprises a nucleating agent, more specifically an α-nucleating agent. For the purposes of the present application, a nucleating agent is defined as a chemical compound that raises the crystallization temperature of the polypropylene composition.

Suitable nucleating agents for use in the present invention can be selected from any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these.

Examples for carboxylate salts are organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1]heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis (p-ethyl-dibenzylidene sorbitol), bis(3,4-dimethyl-dibenzylidene sorbitol) (DMDBS), and bis(4-propylbenzylidene) propyl sorbitol. Bis(3,4-dimethyl-dibenzylidene sorbitol) (DMDBS) and bis(4-propylbenzylidene)propyl sorbitol are preferred. These can for example be obtained from Milliken Chemical under the trade names of Millad 3905, Millad 3940, Millad 3988 and Millad NX8000.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula (II)

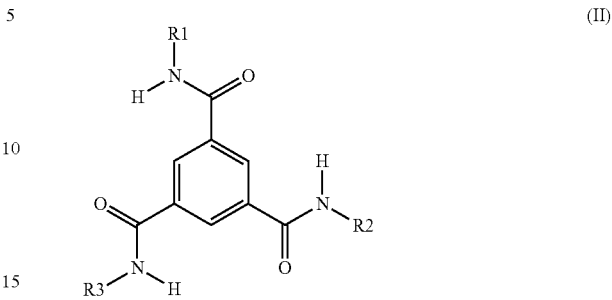

wherein R1, R2 and R3 as indicated in formula (II), independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695. A specific example of such a nucleating agent is N,N',N''-tris(2-methylcyclohexyl)-1,2,3-propanetricarboxamide, which is for example commercially available from Rika International Limited under the tradename RIKACLEAR PC1.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the metallocene random copolymer of propylene and one or more comonomers. In physical blending the polymeric nucleating agent containing vinyl compounds is mixed with the metallocene random copolymer of propylene and one or more comonomers in an extruder or in a blender. In chemical blending the metallocene random copolymer of propylene and one or more comonomers comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further examples of polymeric nucleating agents are poly-3-methyl-1-butene, polydimethylstyrene, polysilanes and polyalkylxylenes. As explained for the polymeric nucleating agents containing vinyl compounds, these polymeric nucleating agents can be introduced into the metallocene polypropylene either by chemical or by physical blending.

It is also possible to use high-density polyethylene, or a polypropylene having a fractional melt flow, or a polypropylene that comprises a fraction of fractional melt flow.

Further, it is possible to use blends of nucleating agents, such as for example a blend of talc and a phosphate ester salt or a blend of talc and a polymeric nucleating agent containing vinyl compounds.

The nucleating agent may be introduced into the polypropylene composition by blending it with a nucleating agent, which is either in pure form or in form of a masterbatch, for example by dry-blending or by melt-blending. It is within the scope of the present invention that the nucleating agent can be introduced into the polypropylene composition by blending it with a thermoplastic polymer comprising a nucleating agent, wherein said thermoplastic polymer is different from the metallocene random copolymer as defined above.

While it is clear to the skilled person that the amount of nucleating agent to be added depends upon its crystallization efficiency, for the purposes of the present invention the nucleating agent or the blend of nucleating agents—if comprised at all—is present in the polypropylene composition in an amount of at least 50 ppm, preferably at least 100 ppm. It is present in an amount of at most 5000 ppm, preferably comonomers. The polyolefins may be atactic, syndiotactic or isotactic. The olefin can for example be ethylene, propylene, 1-butene, 1-pentene, 1-hexene, 4-methyl-1-pentene or 1-octene, but also cycloolefins such as for example cyclopentene, cyclohexene, cyclooctene or norbornene. The comonomer is different from the olefin and chosen such that it is suited for copolymerization with the olefin. The comonomer may also be an olefin as defined above. Further examples of suitable comonomers are vinyl acetate ($H_3C$—$C(=O)O$—$CH=CH_2$) or vinyl alcohol ("HO—CH=$CH_2$", which as such is not stable and tends to polymerize). Examples of olefin copolymers suited for use in the present invention are random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

Exemplary polyamides for use herein may be characterized in that the polymer chain comprises amide groups (—NH—C(=O)—). Polyamides useful in the present invention are preferably characterized by one of the following chemical structures

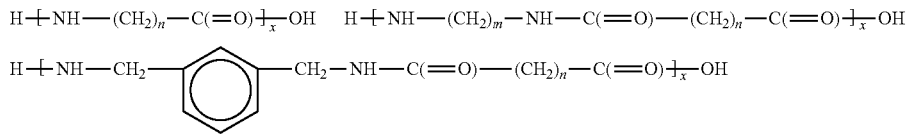

of at most 4000 ppm, even more preferably of at most 3000 ppm and most preferably of at most 2000 ppm.

The polypropylene composition used herein may also comprise further additives, such as by way of example, antioxidants, light stabilizers, acid scavengers, lubricants, antistatic additives, and colorants. An overview of such additives may be found in Plastics Additives Handbook, ed. H. Zweifel, 5th edition, 2001, Hanser Publishers.

The polypropylene composition used herein may further comprise one or more thermoplastic polymers different from the random copolymer of propylene and at least comonomer produced with a metallocene-based polymerization catalyst as described above.

Irrespectively of the number of components, which are comprised in the polypropylene composition, it is understood that their weight percentages, relative to the total weight of the polypropylene composition, add up to 100 wt %.

Preferred suitable thermoplastic polymers that may be used herein may be selected from the group consisting of polyolefins, polyamides and polyesters, with the provision that said polyolefin is different from the propylene random copolymer used herein. By "different from the propylene random copolymer" is meant that the polyolefin differs in at least one characteristic from the above defined propylene random copolymer. Said polyolefin may for example be different in composition, such as for example be based on an alpha-olefin different from propylene (e.g. ethylene, 1-butene, 1-pentene, 1-hexene or 1-octene), or be produced with a Ziegler-Natta catalyst instead of a metallocene-based polymerization catalyst, or have a different type of comonomer or have a different content of comonomer.

Exemplary polyolefins for use herein are olefin homopolymers and copolymers of an olefin and one or more wherein m and n may be independently chosen from one another and be an integer from 1 to 20.

Specific examples of suitable polyamides are polyamides 4, 6, 7, 8, 9, 10, 11, 12, 46, 66, 610, 612, or 613. Another example of a suitable polyamide is Nylon-MXD6, obtainable by polycondensation of meta-xylylene diamine with adipic acid and commercially available for example from Mitsubishi Gas Chemical Company.

Exemplary polyesters for use herein are preferably characterized by the following chemical structure

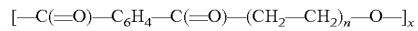

wherein n is an integer from 1 to 10, with preferred values being 1 or 2.

Specific examples of suitable polyesters are polyethylene terephthalate (PET) and polybutylene terephthalate (PBT). Furthermore, preferred polyesters are poly(hydroxy carboxylic acid)s.

With respect to the melt flow index of the polypropylene composition, it is preferred that it is within the same ranges and values as defined above for the random copolymer of propylene and at least one comonomer, produced in presence of a metallocene-based polymerization catalyst, as defined in the present application.

Production of Extrusion Blow-Molded Articles

Extrusion blow-molded articles may be produced by melt-extruding a polypropylene composition as defined above to produce a parison of molten polypropylene composition, wherein the polypropylene composition comprises a propylene random copolymer having been produced by polymerizing propylene and at least one comonomer with a metallocene-based polymerization catalyst as defined above. The parison of molten polypropylene composition is clamped into a mold so that the parison is closed-off at both ends, i.e. forms a closed hollow volume inside. In the following, gas (such as air, nitrogen or any other inert gas) under pressure is injected into the closed-off parison so that the parison is expanded to take the shape of the mold, thus obtaining an expanded parison having the shape of the mold, which is subsequently cooled, and finally the extrusion blow-molded article is ejected. A more detailed description of the extrusion blow-molding process may for example be found in N. C. Lee, Practical Guide to Blow Moulding, Rapra Technology Limited, Shrewsbury, 2006.

Hence, the present application provides for the production of extrusion blow-molded articles by a process comprising the following steps:

(a) polymerizing propylene and at least one comonomer with a metallocene-based polymerization catalyst to obtain a random copolymer of propylene and at least one comonomer, wherein the random copolymer comprises at most 7.0 wt %, relative to the total weight of said random copolymer, of the at least one comonomer;

(b) melt-extruding a polypropylene composition comprising the random copolymer prepared in step (a) to form a parison of molten polypropylene composition;

(c) clamping the parison into a mold so that the parison is closed off at both ends to form a clamped-off parison;

(d) injecting a gas under pressure into the clamped-off parison to obtain an expanded parison having the shape of the mold;

(e) finally cooling and ejecting the extrusion blow-molded article.

Preferably, in step (b) of said process the melt-extrusion of the polypropylene composition is done at a temperature of the molten polypropylene composition that is higher than the melting temperature $T_{melt}$ of said polypropylene composition. More preferably, the temperature of the molten polypropylene composition is at least $T_{melt}+5°$ C. and most preferably at least $T_{melt}+10°$ C., with $T_{melt}$ being the melting temperature of the polypropylene composition. Preferably, in step (b) of said process the melt-extrusion of the polypropylene composition is done at a temperature of the molten polypropylene composition of at most $T_{melt}+50°$ C., more preferably of at most $T_{melt}+40°$ C., even more preferably of at most $T_{melt}+30°$ C., still even more preferably of at most $T_{melt}+25°$ C., and most preferably of at most $T_{melt}+20°$ C., provided that the temperature of the molten polypropylene composition is at most 180° C., and most preferably at most 170° C. The melting temperature $T_{melt}$ of the random copolymer is determined by DSC as described in the test methods.

In addition to the polypropylene layer as described above, the extrusion blow-molded article may also comprise a further layer consisting of a thermoplastic polymer composition. Said thermoplastic polymer composition comprises a thermoplastic polymer selected from the group consisting of polyolefins, polyamides, polyesters and blends of these, with the provision that said thermoplastic polymer composition is different from the polypropylene composition as defined above. Preferably, said thermoplastic polymer is a polyamide or a polyethylene. Most preferably, it is a polyethylene, i.e. that the extrusion blow-molded article comprises a polyethylene layer. Suitable polyolefins, polyamides and polyester are as described above.

The present extrusion blow-molded article is useful in packaging applications, for example in food packaging, detergent packaging, cosmetic packaging, paint packaging, and medical packaging. Examples of food packaging are packaging for juices, dried foods, sweets, candies, nuts, milk products. Examples of detergent packaging are packaging for washing powders, dish soap, household cleaners. Examples of cosmetic packaging are packaging for shower gels, shampoos, oils, cremes, liquid soaps. Examples for medical packaging are packaging for pills, solutions, disinfectants.

Test Methods

The melt flow index (MFI) of polypropylene and polypropylene compositions is determined according to ISO 1133, condition L, at 230° C. and 2.16 kg.

Molecular weights are determined by Size Exclusion Chromatography (SEC) at high temperature (145° C.). A 10 mg polypropylene is dissolved at 160° C. in 10 ml of trichlorobenzene (technical grade) for 1 hour. Analytical conditions for the GPCV 2000 from WATERS are:

Injection volume: +/−400 µl

Automatic sample preparation and injector temperature: 160° C.

Column temperature: 145° C.

Detector temperature: 160° C.

Column set: 2 Shodex AT-806MS and 1 Styragel HT6E

Flow rate: 1 ml/min

Detector: Infrared detector (2800-3000 cm$^{-1}$)

Calibration: Narrow standards of polystyrene (commercially available)

Calculation for polypropylene: Based on Mark-Houwink relation ($\log_{10}(M_{PP})=\log_{10}(M_{PS})-0.25323$); cut off on the low molecular weight end at $M_{PP}=1000$.

The molecular weight distribution (MWD) is then calculated as $M_w/M_n$.

The $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg of polymer are dissolved in 2.0 ml of TCB, followed by addition of 0.5 ml of $C_6D_6$ and 2 to 3 drops of HMDS.

Following data acquisition the chemical shifts are referenced to the signal of the internal standard HMDS, which is assigned a value of 2.03 ppm.

The isotacticity is determined by $^{13}$C-NMR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2,1-insertions. The percentage of mmmm pentads is then calculated according to $$\% \ mmmm = AREA_{mmmm}/(AREA_{mmmm}+AREA_{mmmr}+AREA_{mmrr}+AREA_{mrrm}) \cdot 100$$

Determination of the percentage of 2,1-insertions for a metallocene propylene homopolymer: The signals corresponding to the 2,1-insertions are identified with the aid of published data, for example H. N. Cheng, J. Ewen, Makromol. Chem., vol. 190 (1989), pages 1931-1940. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person and need not be explained further. The percentage of 2,1-insertions is calculated according to $$2,1\text{-insertions(in \%)}=AREA1/(AREA1+AREA2) \cdot 100$$

with the percentage in 2,1-insertions being given as the molar percentage of 2,1-inserted propylene with respect to total propylene.

The determination of the percentage of 2,1-insertions for a metallocene random copolymer of propylene and ethylene is determined by two contributions:
(i) the percentage of 2,1-insertions as defined above for the propylene homopolymer, and
(ii) the percentage of 2,1-insertions, wherein the 2,1-inserted propylene neighbors an ethylene, thus the total percentage of 2,1-insertions corresponds to the sum of these two contributions. The assignments of the signal for case (ii) can be done either by using reference spectra or by referring to the published literature.

Melting temperatures $T_{melt}$ are measured on a DSC Q2000 instrument by TA Instruments based on ISO 3146. To erase the thermal history the samples are first heated to 200° C. and kept at 200° C. for a period of 3 minutes. The reported melting temperatures $T_{melt}$ are then determined with heating and cooling rates of 20° C./min.

EXAMPLES

The advantages of the present invention are illustrated by the following examples using
(i) a random copolymer of propylene and ethylene (denoted as "PP-1") having been produced in a bulk loop reactor using a supported metallocene-based polymerization catalyst with a dimethylsilyl-bridged bis(indenyl)zirconium dichloride derivative as metallocene component, and
(ii) a random copolymer of propylene and ethylene (denoted as "PP-2") having been produced in a bulk loop reactor using a commercial Ziegler-Natta polymerization catalyst.

Both, PP-1 and PP-2 contained a nucleating agent as well as sufficient amounts of antioxidants and acid scavenger to reduce their degradation in melt-processing. Additional properties of PP-1 and PP-2 are given in Table 1.

TABLE 1

| Product | Unit | Example PP-1 | Comparative example PP-2 |
|---|---|---|---|
| Ethylene content | wt % | 2.0 | 3.4 |
| MFI | dg/min | 10 | 1.8 |
| $M_w/M_n$ | | 2.7 | 7.7 |
| Melting temperature $T_{melt}$ | ° C. | 138.2 | 145.8 |
| 2,1-insertions | | 0.7 | 0 |

Single-layer bottles with a volume of 430 ml were extrusion blow-molded on a Kautex KEB extrusion blow molding machine with a screw having a ratio of length over diameter (L/D) of 25. Processing conditions are given in Table 2.

Very surprisingly the metallocene random copolymer as defined in the present application allowed the production of bottles having good mechanical and optical properties at much lower extruder and die temperatures, and consequentially at lower melt temperatures as compared to a comparative random copolymer produced with a Ziegler-Natta polymerization catalyst. Such difference in processability results in significant energy savings while allowing to produce bottles having comparable properties.

Based on these results, it is anticipated that the present invention will in a general way allow to produce extrusion blow-molded articles at a higher throughput than a conventional extrusion blow-molding process with a polypropylene commonly used in extrusion blow-molding.

TABLE 2

| Product | Unit | Example PP-1 | Comparative example PP-2 |
|---|---|---|---|
| Extruder temperatures | | | |
| Zone 1 | ° C. | 150 | 188 |
| Zone 2 | ° C. | 150 | 190 |
| Zone 3 | ° C. | 150 | 192 |
| Zone 4 | ° C. | 150 | 195 |
| Zone 5 | ° C. | 150 | 210 |
| Zone 6 | ° C. | 150 | 210 |
| Die temperature | ° C. | 155 | 210 |
| Temperature of the melt | ° C. | 152 | 205 |
| Mold cooling water temp. | ° C. | 15 | 15 |
| Blowing time | s | 7 | 7 |
| Blowing pressure | bar | 8.6 | 8.6 |
| Total cycle time | s | 12.6 | 13.0 |
| Throughput | kg/h | 10.0 | 10.1 |
| Bottle weight | g | 20.3 | 20.1 |

The invention claimed is:
1. An article comprising:
an extrusion blow-molded bottle, the extrusion blow-molded bottle comprising a polypropylene layer, said polypropylene layer consisting of a polypropylene composition comprising a random copolymer of propylene and at least one comonomer, wherein the comonomer comprises at least one alpha-olefin different from propylene, wherein the random copolymer has a molecular weight distribution, defined as Mw/Mn, of at most 4.0, a percentage of 2,1-insertions of at least 0.3%, relative to the total number of propylene molecules in the chain, comprises at most 7.0 wt %, relative to the total weight of said random copolymer, of the at least one comonomer, and wherein the random copolymer comprises a melt temperature ($T_{melt}$) of less than 140° C. and can be melt-extruded at a temperature of no more than $T_{melt}+20°$ C.

2. The article according to claim 1, wherein the random copolymer of propylene and at least one comonomer comprises at least 0.5 wt % and at most 7.0 wt %, relative to the total weight of said random copolymer, of the at least one comonomer.

3. The article according to claim 1, wherein the alpha-olefin is selected from the group consisting of ethylene, butene-1, pentene-1, hexene-1 and 4-methyl-pentene-1.

4. The article according to claim 1, wherein the random copolymer of propylene and at least one comonomer has a melt flow rate of at least 3.0 dg/min, determined according to ISO 1133, condition L, at 230° C. and 2.16 kg.

5. The article according to claim 1, wherein the random copolymer of propylene and at least one comonomer has a melt flow rate of at most 20 dg/min, determined according to ISO 1133, condition L, at 230° C. and 2.16 kg.

6. The article according to claim 1, wherein the random copolymer of propylene and at least one comonomer has a content of mmmm pentads of at least 90%.

7. The article according to claim 1, wherein the extrusion blow-molded article has a wall thickness of at least 300 μm and of at most 2000 μm.

8. Use of the article of claim 1 in packaging applications.

9. The article according to claim 1, wherein the random copolymer of propylene and at least one comonomer has a melt flow rate of at least 8 dg/min and at most 20 dg/min, determined according to ISO 1133, condition L, at 230° C. and 2.16 kg.

10. The article according to claim 1, wherein the random copolymer of propylene and at least one comonomer is a metallocene propylene random copolymer.

11. The article according to claim 10, wherein the metallocene propylene random copolymer has at least two propylene polymer fractions.

12. The article according to claim 11, wherein the at least two propylene polymer fractions differ in comonomer content, melt flow index, or both.

13. The article according to claim 10, wherein the polypropylene composition comprises one or more thermoplastic polymers different from the metallocene propylene random copolymer.

14. The article according to claim 10, wherein the polypropylene composition comprises at least 50 wt. %, relative to a total weight of the polypropylene composition, of the metallocene propylene random copolymer.

15. The article according to claim 1, wherein the polypropylene composition comprises a nucleating agent, wherein the nucleating agent is talc, a carboxylate salt, a sorbitol acetal, a substituted benzene tricarboxamide, a polymeric nucleating agent, or a blend thereof.

16. An article comprising:
an extrusion blow-molded bottle, the extrusion blow-molded bottle comprising a single polypropylene layer, said polypropylene layer comprising a polypropylene composition comprising a random copolymer of propylene and at least one comonomer, wherein the comonomer comprises at least one alpha-olefin different from propylene, wherein the random copolymer has a molecular weight distribution, defined as Mw/Mn, of at most 4.0, a percentage of 2,1-insertions of at least 0.3%, relative to the total number of propylene molecules in the chain, comprises at most 7.0 wt %, relative to the total weight of said random copolymer, of the at least one comonomer, and wherein the random copolymer comprises a melt temperature ($T_{melt}$) of less than 140° C. and can be melt-extruded at a temperature of no more than $T_{melt}$+20° C.

17. The article according to claim 13, wherein the one or more thermoplastic polymers is a polyamide or a polyester.

18. The article according to claim 13, wherein the one or more thermoplastic polymers is a propylene random copolymer.

19. The article according to claim 1 further comprising a second layer, the second layer comprising a thermoplastic polymer, wherein the thermoplastic polymer of the second layer is different than the polypropylene of the polypropylene layer.

20. The article according to claim 19, wherein the thermoplastic polymer is a polyolefin, polyamide, polyester, or a blend thereof.

* * * * *